United States Patent [19]

Versluis

[11] Patent Number: 4,855,987
[45] Date of Patent: Aug. 8, 1989

[54] OPTICAL DEVICE COMPRISING A HOLDER ACCOMMODATING AN OPTICAL SYSTEM WHICH COMPENSATES FOR THERMAL EXPANSION/CONTRACTION

[75] Inventor: Johannes W. Versluis, Eindhoven, Netherlands

[73] Assignee: U.S. Philips Corp., New York, N.Y.

[21] Appl. No.: 304,934

[22] Filed: Jan. 31, 1989

Related U.S. Application Data

[63] Continuation of Ser. No. 72,835, Jul. 13, 1987, abandoned.

[30] Foreign Application Priority Data

Feb. 23, 1987 [NL] Netherlands ................... 8700440

[51] Int. Cl.$^4$ ............... G11B 7/00; G01J 1/20; G02B 7/02
[52] U.S. Cl. .................. 369/112; 369/45; 250/216; 250/570; 250/201; 350/533; 350/253
[58] Field of Search ............ 369/112, 45; 350/533, 350/253, 415; 250/201 DF, 216, 570, 238

[56] References Cited

U.S. PATENT DOCUMENTS

| | | | |
|---|---|---|---|
| 4,162,120 | 7/1979 | Moreno | 350/253 |
| 4,533,826 | 8/1985 | van Alem | 250/201 DF |
| 4,546,463 | 10/1985 | Opheij et al. | 369/110 |
| 4,592,627 | 6/1986 | Smid | 350/432 |
| 4,609,945 | 9/1986 | Oguino | 350/253 |
| 4,641,023 | 2/1987 | Ando et al. | 250/216 |
| 4,720,168 | 1/1988 | Kaneko | 350/253 |
| 4,721,373 | 1/1988 | Sugiyama | 350/482 |
| 4,753,524 | 6/1988 | Sugiyama | 350/480 |
| 4,796,252 | 1/1989 | Maan | 369/112 |

FOREIGN PATENT DOCUMENTS

| | | | |
|---|---|---|---|
| 2830341 | 1/1979 | Fed. Rep. of Germany | 350/253 |
| 151230 | 10/1981 | Fed. Rep. of Germany | 350/253 |
| 54-19757 | 2/1979 | Japan | 350/253 |
| 57-202508 | 12/1982 | Japan | 350/253 |
| 58-21706 | 2/1983 | Japan | 350/253 |
| 58-203405 | 11/1983 | Japan | 350/253 |
| 59-211013 | 11/1984 | Japan | 350/253 |

*Primary Examiner*—William L. Sikes
*Assistant Examiner*—Brian M. Healy
*Attorney, Agent, or Firm*—William L. Botjer

[57] ABSTRACT

An optical system is described, for example a radiation source unit (10) supplying a collimated radiation beam (RB), comprising a tubular holder (30) a radiation source (33) arranged in the holder and an optical system having a collimator lens (37). The displacement of the focus of the optical system caused by the variation in length of the holder occurring at a varying temperature can be compensated by a suitable choice of notably the geometry ($R_1$, $D_1$) and the refractive index ($n_1$) of the collimator lens.

12 Claims, 3 Drawing Sheets

OPTICAL DEVICE COMPRISING A HOLDER ACCOMMODATING AN OPTICAL SYSTEM WHICH COMPENSATES FOR THERMAL EXPANSION/CONTRACTION

This is a continuation of application Ser. No. 072,835, filed July 13, 1987 now abandoned.

BACKGROUND OF THE INVENTION

The invention relates to an optical device comprising a holder accommodating a system of optical elements, inter alia a lens system, which elements are secured to the inner wall of the holder.

A device of this type is known in many embodiments. Examples of such a device are a telecentric lens system and an optical device in the form of a radiation source unit supplying a collimated radiation beam and having a radiation source and a collimator lens whose object focal plane must coincide with the radiating surface of the radiation source. This radiation source unit is used, for example, in an apparatus for scanning an information plane in an optical record carrier with a radiation spot, to which apparatus the invention also relates.

An apparatus of this type is described in U.S. Pat. No. 4,546,463. An objective system which focuses the parallel beam supplied by the radiation source unit to a scanning spot in the information plane is arranged between the radiation source unit and the record carrier. Scanning an information plane is to be understood to mean both scanning a recorded information plane with a read beam and scanning for the purpose of writing information in this plane with a radiation beam that is intensity-modulated in accordance with the information to be written, as described in U.S. Pat. No. 4,546,463.

In order that an optical record carrier can comprise a sufficiently large quantity of information, the optical details of its information structure must have very small dimensions, of the order of one micrometer. The scanning spot must have a corresponding size. Such a scanning spot is obtained with an objective system having a sufficiently large numerical aperture, at least of the order of 0.40, and whose aperture is adequately filled by the beam in such a manner that a diffraction-limited radiation spot is formed in the information plane. It must be ensured that the scanning spot has a constant size and a constant intensity distribution.

To this end it is not only required that the focal plane of the objective system always coincides with the information plane, which can be realized in various known manners, but also that the beam entering the objective system and coming from the radiation source unit is always parallel and has a constant cross-section. This means that in the radiation source unit the radiating surface of the radiation source must always coincide with the object focal plane of the collimator lens.

The distance between the radiating surface and the collimator lens is determined by the length of the portion of the holder located between these two elements, in which holder the radiation source and the collimator lens are secured. Due to variations of the ambient temperature this length may change so that the radiating surface of the radiation source is moved with respect to the collimator lens. Then the beam supplied by the radiation source unit is no longer optimally parallel. An analogous problem generally presents itself in optical systems whose elements are secured in a holder having a given coefficient of expansion and in which stringent requirements are imposed on the mutual positioning of the optical elements.

SUMMARY OF THE INVENTION

The present invention has for its object to provide a general solution to this problem and to provide optical devices whose optical behaviour is substantially independent of temperature variations. An optical device according to the invention is characterized in that the equivalent coefficient of expansion of the optical system giving the change in the optical behaviour of this system as a function of the temperature and being determined by:

the coefficients of expansion of the materials of the optical elements, the refractive indices of these materials and their variations with temperature, and the dimensions of the optical elements is equal to the coefficient of expansion of the holder material which is located between the fixations on the holder of the two outer elements of the optical system.

The invention utilizes the fact that the optical behaviour of each of the element determining the radiation beam is also dependent on the ambient temperature. The refractive index of these elements is dependent on the temperature, whilst these elements also exhibit a given coefficient of expansion. According to the invention the parameters of the optical elements are chosen to be such that the changes in the optical behaviour of the elements caused by temperature variations compensate the change in the optical behaviour of the optical system which is caused by the change in distance between the optical elements which change is caused by expansion or shrinkage of the holder.

The optical elements may entirely consist of glass. These elements may alternatively be made of a synthetic material. Hitherto the use of synthetic material elements such as synthetic material lenses in optical systems has had the drawback that the refractive indices of the synthetic materials are temperature-dependent to a relatively large extent, whilst in addition the synthetic materials have a relatively large coefficient of expansion so that the optical behaviour of the elements varies to a relatively great extent with the temperature. This drawback is obviated when using the inventive idea according to which this variation is compensated by a suitable choice of the coefficient of expansion of the material of the holder accommodating the optical system.

It is noted that in the art of optics the problem of the influence of temperature variations on the behaviour of an optical system has been known for a long time and that it has been attempted in various manners to solve this problem. In the German patent application No. 2,830,341 laid open to public inspection it is established that the image field of a composite objective system shifts upon temperature changes due to the change in length of the objective holder. To solve this problem it is proposed to manufacture at least one of the fittings of the lens elements from a material which is different from the material of the fittings of the other elements. Furthermore U.S. Pat. No. 4,162,120 states that temperature variations may result in expansion or shrinkage of glass lenses and cause changes in the refractive index of these lenses, and, in expansion or shrinkage of the lens fittings so that the focal length of the lens system varies. It is proposed as a solution to provide a special connection between the lens fittings and the holder which connection comprises alternately first and second elements which have high and low coefficients of expansion, respectively.

In none of the known optical systems the temperature coefficients of the elements are adapted to the coefficient of expansion of the holder accommodating these elements.

The invention can be used advantageously in an optical device in the form of a radiation source unit supplying a collimated radiation beam and having a radiation source and a collimator lens whose object focal plane must coincide with the radiating surface of the radiation source. This radiation source unit is characterized in that the collimator lens is a single lens and in that the equivalent coefficient of expansion giving the variation of the front focal length of the collimator lens as a function of the temperature is equal to the coefficient of expansion of the holder material which is present between the fixations on the holder of the radiation source and the collimator lens.

The front focal length is the length, measured along the optical axis, between the focus of the collimator lens and the refractive surface of this lens located on the side of this focus.

When using a single lens the condition at which the variation in optical behaviour due to the variation of the lens compensates the variation caused by the change in length of the holder can be derived in a simple manner.

The simplest embodiment of the radiation source unit comprising only a radiation source and a collimator lens is characterized in that the collimator lens is a plane convex lens and in that the following condition is satisfied.

$$\alpha_{eq} \cdot f_t = \alpha_1 \left( f - \frac{D_1}{n_1} \right) + \left( \frac{D_1}{n_1^2} - \frac{f}{n_1 - 1} \right) \frac{dn_1}{dT} = \alpha_2 \cdot L$$

in which
$f_t$ is the front focal length,
$\alpha_{eq}$ is the equivalent optical coefficient of expansion,
f is the object focal length of the collimator lens,
$\alpha_1$ is the coefficient of expansion of the collimator lens material,
$D_1$ is the axial thickness of the collimator lens,
$n_1$ is the refractive index of the collimator lens material,
d/dT is the derivative with respect to temperature,
$\alpha_2$ is the coefficient of expansion of the holder material between the radiation source and the collimator lens,
L is the length of the holder between the radiation source and the collimator lens.

An embodiment of a single planoconvex collimator lens is described in U.S. Pat. No. 4,592,627. The convex surface of this lens has an aspherical profile so that the lens is satisfactorily corrected for spherical aberrations.

Particularly in a radiation source unit which is intended for use in an optical write and/or read device, a diode laser is preferably used as a radiation source. However, the wavelength of the radiation supplied by such a laser varies with the temperature. Since the refractive index which an optical element has for a given radiation depends on the wavelength of this radiation the change in wavelength will also influence the optical behaviour of the optical system in the holder. This effect is compensated in a radiation source unit which is further characterized in that the following condition is satisfied.

$$\alpha_1 \left( f - \frac{D_1}{n_1} \right) +$$

$$\left( \frac{D_1}{n_1^2} - \frac{f}{n_1 - 1} \right) \left( \frac{\partial n_1}{\partial \lambda} \frac{\partial \lambda}{\partial T} + \frac{\partial n_1}{\partial T} \right) = \alpha_2 L$$

in which $\partial/\partial\lambda$ and $\partial/\partial T$ are the partial derivatives with respect to wavelength and temperature, respectively.

Instead of a planoconvex lens whose convex surface is aspherical, the collimator lens may be alternatively a biconvex lens whose surfaces are aspherical or not aspherical. The embodiment of the radiation source unit having such a lens is characterized in that the following condition is satisfied $$\left( f - \frac{f}{f_1} \frac{D_1}{n_1} \right) \left( \alpha_1 + \frac{f}{f_1} \frac{D_1}{n_1^2 R_2} \frac{dn_1}{dT} \right) +$$

$$\left( \frac{f}{f_1} \frac{D_1}{n_1^2} - \frac{f}{n_1 - 1} \right) \frac{dn_1}{dT} = \alpha_2 L.$$

in which
f is the object focal length of the collimator lens,
$f_1$ is the equivalent focal length of only the surface of the collimator lens remote from the radiation source.
$D_1$ is the axial thickness of the collimator lens,
$n_1$ is the refractive index of the collimator lens material,
$R_2$ is the radius of curvature of the surface of the collimator lens facing the radiation source,
d/dT is the derivative with respect to temperature,
$\alpha_2$ is the coefficient of expansion of the holder material between the radiation source and the collimator lens and
L is the length of the holder between thr radiation source and the collimator lens.

By replacing $R_2$ by $-R_2$ the condition for a concave-convex collimator lens whose concave surface has a radius of curvature $R_2$ is obtained.

Also in these embodiments a diode laser with a temperature-dependent wavelength may be used as a radiation source, which radiation source unit is further characterized in that the following condition is satisfied $$\left( f - \frac{f}{f_1} \frac{D_1}{n_1} \right) \left( \alpha_1 + \right.$$

$$\left. \frac{f}{f_1} \frac{D_1}{n_1^2 R_2} \left( \frac{\partial n_1}{\partial \lambda} \frac{\partial \lambda}{\partial T} + \frac{\partial n_1}{\partial T} \right) \right) +$$

$$\left( \frac{f}{f_1} \frac{D_1}{n_1^2} - \frac{f}{n_1 - 1} \right) \left( \frac{\partial n_1}{\partial \lambda} \frac{\partial \lambda}{\partial T} + \frac{\partial n_1}{\partial T} \right) = \alpha_2 \cdot L$$

in which $\partial/\partial\lambda$ and $\partial/\partial T$ are the partial derivatives with respect to wavelength and temperature, respectively.

When using a radiation source unit in a device for reading an optical record carrier having a radiation-reflecting information surface, a beam-separating element, for example a prism having a semi-transparent interface is arranged between the radiation source and the collimator lens, as is shown in U.S. Pat. No. 4,592,627. The purpose of this element is to separate the beam reflected by the information structure from the beam emitted by the radiation source and to direct the first-mentioned beam onto a radiation-sensitive detection system. By arranging such an element the optical path length between the radiation source and the collimator lens is changed and, since the material of this element has a coefficient of expansion and a temperature-dependent refractive index, temperature variations will influence the optical behaviour of this element and hence that of the radiation source unit.

According to the invention this effect may also be compensated by a suitable choice of the parameters of the other optical elements in the radiation source unit.

Such a radiation source unit having a plano-convex collimator lens is characterized in that the following condition is satisfied $$\alpha_1 \left( f - \frac{D_1}{n_1} \right) + \left( \frac{D_1}{n_1^2} - \frac{f}{n_1 - 1} \right) \frac{dn_1}{dT} +$$

$$\frac{D_3}{n_3} \left\{ (n_3 - 1) \alpha_3 + \frac{1}{n_3} \frac{dn_3}{dT} \right\} = \alpha_2 \cdot L$$

in which $D_3$, $n_3$ and $\alpha_3$ are the axial thickness of the beam-separating element, the refractive index of the element material and the coefficient of expansion of this material, respectively. The other quantities of this equation have been defined hereinbefore.

If the radiation source in this embodiment is a diode laser whose wavelength is temperature-dependent, the terms dn/dT in the latter equation must be replaced by $$\frac{\partial n}{\partial \lambda} \frac{\partial \lambda}{\partial T} + \frac{\partial n}{\partial T}$$

A radiation source unit having a beam-separating prism and a biconvex collimator lens is characterized in that the following condition is satisfied $$\left( f - \frac{f}{f_1} \frac{D_1}{n_1} \right) \left( \alpha_1 + \frac{f}{f_1} \frac{D_1}{n_1^2 R_2} \cdot \frac{dn_1}{dT} \right) +$$

$$\left( \frac{f}{f_1} \frac{D_1}{n_1^2} - \frac{f}{n_1 - 1} \right) \frac{dn_1}{dT} +$$

$$D_3 \left( \frac{n_3 - 1}{n_3} \alpha_3 + \frac{1}{n_3^2} \frac{dn_3}{dT} \right) = \alpha_2 \cdot L.$$

Also in this embodiment a diode laser having a temperature-dependent wavelength can again be used as a radiation source, in which case the terms dn/dT must be replaced by $$\frac{\partial n}{\partial \lambda} \frac{\partial \lambda}{\partial T} + \frac{\partial n}{\partial T}$$

The invention also relates to a device for scanning an infomration plane in an optical record carrier, which device comprises a radiation source supplying a scanning beam and an objective system for focussing the scanning beam to a scanning spot in the information plane. The sensitivity to temperature variations of such a device is limited if this device is characterized in that the radiation source unit is in the form of one of the above-mentioned embodiments according to the invention.

BRIEF DESCRIPTION OF THE DRAWING

The invention will now be described in greater detail by way of example with reference to the accompanying drawings in which.

DETAILED DESCRIPTION OF THE PREFERRED EMBODIMENT

Figure 1:
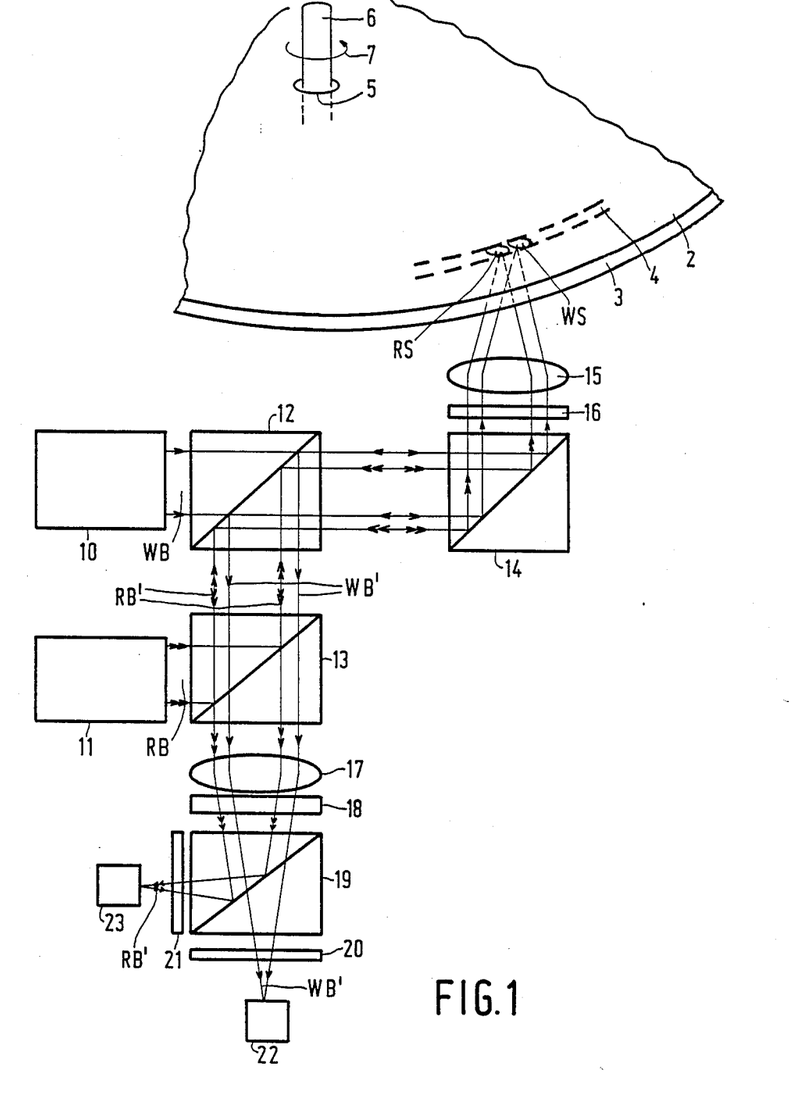
FIG. 1 shows a known device for both writing and reading an optical record carrier.

FIG. 1 shows in a perspective view a part of a round disc-shaped record carrier 1. The information plane 2 of this carrier in which a user can write information and read it afterwards is located on the upper side of the record carrier so that writing and reading is effected through the carrier substrate 3 by means of a write spot WS and a read spot RS, respectively. A previously provided servo-track 4 of which only a small part is shown in FIG. 1 is present in the information plane 2. By rotating, in the direction of the arrow 7, the record carrier about a shaft 6 inserted through a central opening 5 in the carrier the spots can scan a revolution of the servo-track 4. The entire spiral-shaped servo-track is scanned by a defined movement of the two spots in the radial direction.

The write and read device has two radiation source units 10 and 11 supplying a write beam WB and a read beam RB, respectively. These beams are directed towards an objective system 15 by means of a reflector 14 which is adjustable, for example in the tangential and radial directions, and the objective system focuses the beam WB to a write spot WS and the beam RB to a read spot RS in the information surface.

The beams WB and RB emitted by the radiation source units 10 and 11 are linearly and mutually perpendicularly polarized. A beam-splitter 13, for example a partially transparent prism is arranged in the path of the beam RB, which prism reflects this beam to a polarisation-sensitive beam splitter 12, for example in the form of a prism. This prism reflects both the beam RB from the radiation source unit and the beam RB' reflected by the information plane. The write beam WB is passed by the beam splitter 12 and traverses a highly selective λ/4 plate 16 twice on its path to and from the information plane. λ is the wavelength of the beam WB. The plate 16 rotates the direction of polarisation of only the write beam through 90° so that the reflected beam WB' is reflected by the beam splitter 12. The highly selective plate 16 does not have any influence on the direction of polarisation of the read beam RB.

The beams WB' and RB' which are reflected by the beam splitter 12 and which have the same direction of polarisation are passed by the prism 13 to their associated detectors 22 and 23. The beams WB' and RB' may be separated from each other by, for example the combination of a highly selective α/2-plate 1, which rotates the direction of polarisation of one of the beams through 90°, and a polarisation-sensitive beam separator 19 which substantially passes one of the beams, for example WB' and substantially reflects the other beam to the detectors 22 and 23, respectively. Wavelength-selective filters 20 and 21 may be arranged in front of the detectors, which filters prevent radiation of the write beam and the read beam from reaching the detector for the read beam and the write beam, respectively. The lens 17 focuses the parallel beams WB' and RB' on the detectors 22 and 23.

For further details about writing and reading with the device according to FIG. 1 and about the servo-systems used for tracking and focusing reference is made to U.S. Pat. No. 4,546,463 in which other embodiments of the write-read device based on the same principle are described.

For a satisfactory operation of the device it is required for the beams entering the objective system to have a constant cross-section, in other words the radiation source units should supply beams which are constantly collimated independent of temperature variations.

Figure 2:
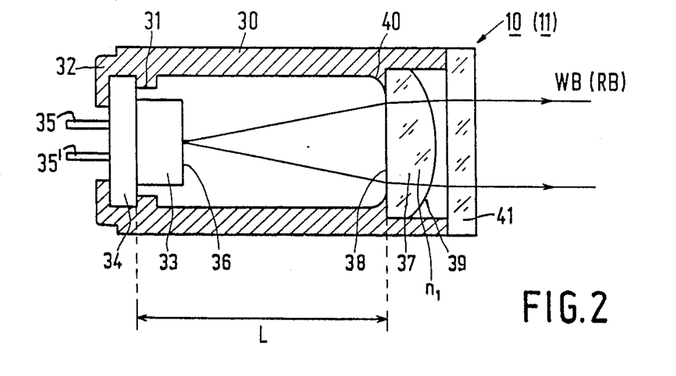
FIG. 2 shows a radiation source unit according to the invention for use in this device.

As is shown in FIG. 2 each radiation source unit 10 and 11 comprises a holder 30, for example of aluminium or stainless steel. This holder has an abutment 31. A radiation source in the form of a diode laser 33 has a flange 34 whose top face engages the abutment 31 and whose side face engages the inner wall of the holder. The diode laser is fixed in the holder by means of the bent edges 32. Furthermore the holder comprises a collimator lens 37 which is arranged between the bent edges 40 and is fixed against the inner wall of the holder, for example by means of an adhesive. The holder may be closed by means of a transparent plate 41. The radiation source unit may further have a cylindrical lens at the area of the plate 41 or between this plate and the radiation source for correction of possible astigmatism of the beam.

The collimator lens is for example a planoconvex lens whose plane surface 38 faces the diode laser. It must be ensured that the distance between the surface 38 and the diode laser is such that the radiating surface 36 of the diode laser is located in the focal plane of the collimator lens. However, under the influence of temperature variations the holder may expand or shrink so that the distance between the radiating surface 36 and the surface 38 of the collimator lens changes, which results in the surface 36 no longer coinciding with the focal plane of the collimator lens and in the beam WB or RB emanating from this lens no longer being collimated. According to the invention the refractive index, the coefficient of expansion and the other lens parameters are chosen to be such that the length variation of the holder is compensated for.

The condition under which this is effected will now be described with reference to FIG. 3. In this FIG. $F_1$ is the object focus in which focus the radiating surface of the laser must be located. f is the focal length, or the distance between the focus $F_1$ and the principal plane H of the lens. $f_t$ is the co-called front focal length, that is to say the distance, measured along the optical axis 00', between the surface 38 of the lens and the focus $F_1$. $L_H$ is the distance between the surface 38 and the principal plane H and $D_1$ is the axial thickness of the collimator lens. $R_1$ is the radius of curvature of the convex surface 39 of the lens. It is assumed that the lens is secured in the holder at the position of the surface 38 and that the radiation source is secured in the holder at the position of the radiating surface of this source. The expansion $dL/dT = \alpha_2 L$ of the holder portion having a length L between the said areas of fixation must then be equal to the change $df_t/dT \cdot \alpha_2$ is the coefficient of expansion of the holder material.

Figure 3:
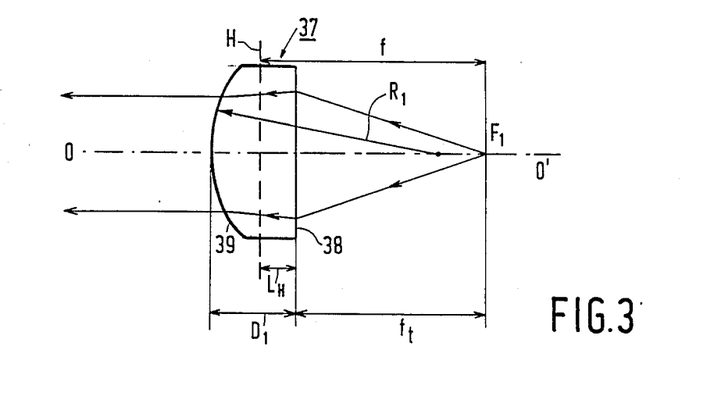
FIG. 3 shows a planoconvex collimator lens for use in the radiation source unit.

As is apparent from FIG. 3

$$f_t = f - L_H$$

The focal length f of a planoconvex lens is given by $$f = \frac{R_1}{n_1 - 1} \quad (2)$$

in which $n_1$ is the refractive index of the lens material. For $L_H$ it holds that $$L_H = \frac{D_1}{n_1}$$

Therefore it holds that $$f_t = \frac{R_1}{n_1 - 1} - \frac{D_1}{n_1} \quad (3)$$

In the case of temperature variations both the geometry of the lens, and hence the quantities $R_1$ and $D_1$ and the refractive index $n_1$ change so that $$\frac{df_t}{dT} = \frac{1}{n_1 - 1} \cdot \frac{dR_1}{dT} - \frac{R}{(n_1 - 1)^2} \cdot \frac{dn_1}{dT} - \quad (4)$$

$$\frac{1}{n_1} \frac{dD_1}{dT} + \frac{D_1}{n_1^2} \frac{dn_1}{dT}$$

By filling in $$\frac{1}{R_1} \frac{dR_1}{dT} = \alpha_1 = \frac{1}{D_1} \frac{dD_1}{dT}$$

with $\alpha_1$ being the coefficient of expansion of the lens material, and $$\frac{R_1}{n_1 - 1} = f$$

equation (4) changes into $$\frac{df_t}{dT} = \alpha_1 \left( f - \frac{D_1}{n_1} \right) + \left( \frac{D_1}{n_1^2} - \frac{f}{n_1 - 1} \right) \frac{dn_1}{dT} = \quad (5)$$

$$\alpha_{eq} \cdot f_t$$

in which $\alpha_{eq}$ can be indicated as an equivalent coefficient of expansion, or in other words the change of the focal length per degree of temperature change due to changes within the optical system. According to the invention it is ensured that $$\alpha_{eq} \cdot f_t = \alpha_2 \cdot L$$

so that, if $f_t$ and L are equal $\alpha_{eq} = \alpha_2$.

The radiation source which is used in the radiation source unit is preferably a diode laser, for example an AlGaAs laser. For such a laser the wavelength $\lambda$ of the emitted radiation can vary with the temperature. A great advantage of the present invention is that this variation can also be compensated for by taking this variation into account when choosing the parameters in equation (5).

Since the refractive index $n_1$ of the lens material depends on the wavelength of the radiation passing through the lens, $dn_1/dT$ in equation (5) must be replaced by $$\frac{\partial n_1}{\partial \lambda} \cdot \frac{\partial \lambda}{\partial T} + \frac{\partial n_1}{\partial T}$$

in which the symbols $\partial/\partial\lambda$ and $\partial/\partial T$ denote the partial derivatives with respect to wavelength and temperature, respectively. According to the invention, for a radiation source unit having a radiation source whose wavelength depends on the temperature it holds that $$\alpha_1 \left( f - \frac{D_1}{n_1} \right) + \left( \frac{D_1}{n_1^2} - \frac{f}{n_1 - 1} \right) \left( \frac{\partial n_1}{\partial \lambda} \cdot \frac{\partial \lambda}{\partial T} + \frac{\partial n_1}{\partial T} \right) = \alpha_2 L. \quad (6)$$

Instead of a planoconvex lens, a lens having two curved refractive surfaces may be used alternatively as a collimator lens, for example a biconvex lens.

Figure 4:
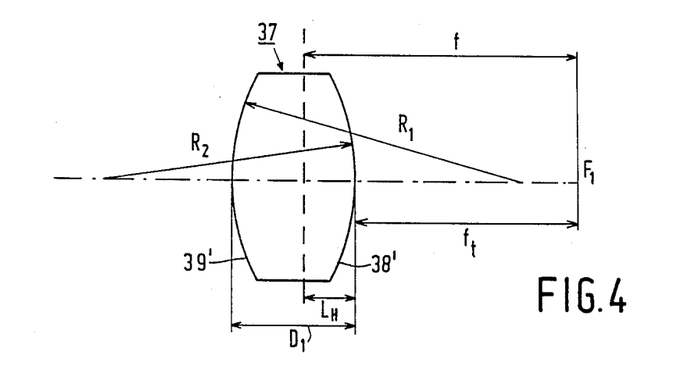
FIG. 4 shows a biconvex collimator lens.

FIG. 4 shows a biconvex lens. As is known from the Handbooks on Optics it holds for the focal length f of a biconvex lens that:

$$f = \frac{R_1 R_2}{n_1 - 1} \cdot \frac{1}{R_1 + R_2 - D_1 \cdot \frac{n_1 - 1}{n_1}} \quad (7)$$

and the front focal length is given by:

$$f_t = f \left( 1 - \frac{n_1 - 1}{n_1} \cdot \frac{D_1}{R_1} \right) = f \left( 1 - \frac{D_1}{n_1} \cdot \frac{1}{f_1} \right) \quad (8)$$

in which $$f_1 = \frac{R_1}{n_1 - 1}$$

so that $$\frac{df_t}{dT} = \left( 1 - \frac{D_1}{n_1} \cdot \frac{1}{f_1} \right) \frac{df}{dT} + \quad (9)$$

$$f \frac{d}{dT} \left( 1 - \frac{n_1 - 1}{n_1} \cdot \frac{D_1}{R_1} \right)$$

since $D_1$ and $R_1$ relate to the same material:

$$\frac{d}{dT} \frac{D_1}{R_1} = 0$$

so that for the second term on the right-hand side in (9) it holds that:

$$f \frac{d}{dT} \left( 1 - \frac{n_1 - 1}{n_1} \cdot \frac{D_1}{R_1} \right) = f \frac{D_1}{R_1} \cdot \frac{d}{dT} \left( \frac{n_1 - 1}{n_1} \right)$$

Consequently it holds that $$f \frac{d}{dT} \left( 1 - \frac{n_1 - 1}{n_1} \cdot \frac{D_1}{R_1} \right) = -f \frac{D_1}{R_1} \cdot \frac{1}{n_1^2} \cdot \frac{dn_1}{dT} = \quad (10)$$

$$-\frac{f}{n_1^2} \cdot D_1 \cdot \frac{1}{f_1(n_1 - 1)} \cdot \frac{dn_1}{dT}$$

For the lens according to FIG. 4 it also holds that $$f = f_1 \cdot \frac{R_2}{R_1 + R_2 - D_1 \cdot \frac{n_1 - 1}{n_1}} \quad (11)$$

so that $$\frac{df}{dT} = \frac{R_2}{R_1 + R_2 - D_1 \frac{n_1 - 1}{n_1}} \cdot \frac{df_1}{dT} +$$

$$f_1 \frac{d}{dT} \frac{R_2}{R_1 + R_2 - D_1 \frac{n_1 - 1}{n_1}}$$

Since $R_1$, $R_2$ and $D_1$ relate to the same material it holds that:

$$f_1 \frac{d}{dT} \cdot \frac{R_2}{R_1 + R_2 - D_1 \frac{n_1 - 1}{n_1}} =$$

$$- \frac{f_1 R_2}{\left( R_1 + R_2 - D_1 \frac{n_1 - 1}{n_1} \right)^2} \cdot D_1 \cdot \frac{d}{dT} \left( \frac{n_1 - 1}{n_1} \right)$$

so that:

$$\frac{df}{dT} = \frac{f}{f_1} \cdot \frac{df_1}{dT} - \frac{f_1 R_2}{\left( R_1 + R_2 - D_1 \frac{n_1 - 1}{n_1} \right)^2} \cdot D_1 \cdot$$

$$\frac{d}{dT} \left( \frac{n_1 - 1}{n_1} \right)$$

and hence:

$$\frac{df}{dT} = \frac{f}{f_1} \cdot \frac{df_1}{dT} + \frac{fD_1}{n_1^2} \cdot \frac{1}{R_1 + R_2 - D_1 \frac{n_1 - 1}{1}} \cdot \frac{dn_1}{dT} \quad (12)$$

In this expression $f_1$ corresponds to f in the expression (2) for the planoconvex lens from which it can be derived that:

$$\frac{1}{f_1} \frac{df_1}{dT} = \alpha_1 - \frac{1}{n_1 - 1} \cdot \frac{dn_1}{dT} \quad (13)$$

so that (12) can be written as:

$$\frac{df}{dT} = f\left(\alpha_1 - \frac{1}{n_1 - 1} \cdot \frac{dn_1}{dT}\right) + \frac{fD_1}{R_1 + R_2 - D_1 \frac{n_1 - 1}{n_1}} \cdot \frac{1}{n_1^2} \cdot \frac{dn_1}{dT} \quad (14)$$

and hence:

$$\frac{1}{f} \frac{df}{dT} = \alpha_1 + \left(\frac{fD_1}{f_1 \cdot n_1^2 \cdot R_2} - \frac{1}{n_1 - 1}\right)\frac{dn_1}{dT} \quad (15)$$

Filling in (10) and (15) and (9) results in:

$$\frac{df_t}{dT} = \left(f - \frac{D_1}{n_1} \frac{f}{f_1}\right)\alpha + \left(\frac{f \cdot D_1}{f_1 n_1^2 R_2} - \frac{1}{n_1 - 1}\right)\frac{dn_1}{dT} - \frac{fD_1}{f_1 n_1^2} \cdot \frac{1}{n_1 - 1} \cdot \frac{dn_1}{dT} \quad (16)$$

whose right-hand term can be arranged as:

$$\frac{df_t}{dT} = \left(f - \frac{f}{f_1} \frac{D_1}{n_1}\right)\left(\alpha_1 + \frac{f}{f_1} \frac{D_1}{n_1^2 R_2} \frac{dn_1}{dT}\right) + \quad (17)$$

$$\left(\frac{f}{f_1} \frac{D}{n_1^2} - \frac{f}{n_1 - 1}\right)\frac{dn_1}{dT} = \alpha_2 L.$$

If a biconvex collimator lens in the radiation source unit is combined with a diode laser whose wavelength is temperature-dependent, $dn_1/dT$ in expression (17) must be replaced by $\partial n_1/\partial \lambda \cdot \partial \lambda/\partial T + \partial n_1/\partial T$ so that:

$$\left(f - \frac{f}{f_1} \frac{D_1}{n_1}\right)\left\{\alpha_1 + \quad (18)\right.$$

$$\left.\frac{f}{f_1} \frac{D_1}{n_1^2 R_2}\left(\frac{\partial n_1}{\partial \lambda} \frac{\partial \lambda}{\partial T} + \frac{\partial n_1}{\partial T}\right)\right\} +$$

$$\left(\frac{f}{f_1} \frac{D_1}{n_1^2} - \frac{f}{n_1 - 1}\right)\left(\frac{\partial n_1}{\partial \lambda} \frac{\partial \lambda}{\partial T} + \frac{\partial n_1}{\partial T}\right) = \alpha_2 \cdot L$$

If in (18) $R_2$ is provided with a minus-sign, the condition for temperature compensation is obtained for a radiation source unit having a concave-convex collimator lens whose concave surface has a radius of curvature $R_2$.

Figure 5:
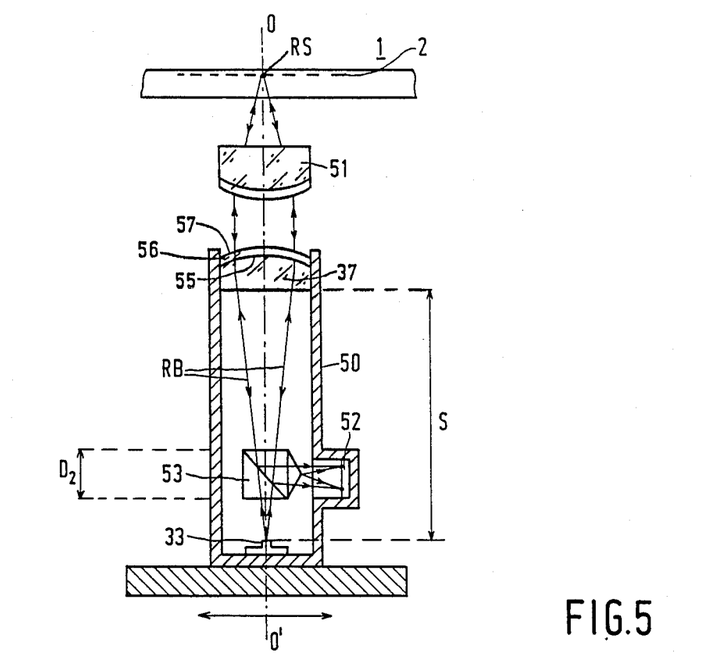
FIG. 5 shows a device for reading an optical record carrier having a read unit which is provided with a beam-separating prism.

FIG. 5 shows diagrammatically a radiation source unit 50 which in combination with an objective system 51 and a built-in radiation-sensitive detection system 52 constitutes a read device which is particularly suitable for reading optical record carriers. For the operation of this device reference is made to the U.S. Pat. No. 4,592,627 in which the device has been described in detail. In connection with the present invention it is only important that a beam-separating element, for example in the form of a partially transparent prism 53 is arranged between the diode laser 33 and the collimator lens 37. This prism passes a part of the beam RB emitted by the diode laser to the record carrier 1 and reflects a part of the beam reflected by the information plane 2 to the radiation-sensitive detection system 52.

By arranging the prism in the radiation path the optical path length changes by $$D_3 \cdot \frac{n_3 - 1}{n_3}$$

in which $D_3$ is the thickness of the prism, measured along the optical axis $00'$ and $n_3$ is the refractive index of the prism material. For the optical path length S between the radiating surface of the diode laser and the collimator lens 37 it now holds that:

$$S = f_t + D_3 \frac{n_3 - 1}{n_3} \quad (19)$$

and for the change caused by temperature variations it holds that:

$$\frac{dS}{dT} = \frac{df_t}{dT} + \frac{n_3 - 1}{n_3} \frac{dD_3}{dT} + D_3 \frac{d}{dT}\left(\frac{n_3 - 1}{n_3}\right)$$

hence $$\frac{dS}{dT} = \frac{df_t}{dT} + \frac{n_3 - 1}{n_3} \alpha_3 \cdot D_3 + \frac{D_3}{n_3^2} \frac{dn_3}{dT} \quad (20)$$

If, as shown in FIG. 5, the collimator lens is a planoconvex lens, the expression (5) can be filled in for $df_t/dT$ and $$\frac{dS}{dT} = \alpha_1\left(f - \frac{D_1}{n_1}\right) + \left(\frac{D_1}{n_1^2} - \frac{f}{n_1 - 1}\right)\frac{dn_1}{dT} + \quad (21)$$

$$\frac{D_3}{n_3}\left\{(n_3 - 1)\alpha_3 + \frac{1}{n_3} \frac{dn_3}{dT}\right\} = \alpha_2 L.$$

If the collimator lens is a biconvex lens $df_t/dT$ must be replaced by the expression (17) so that:

$$\frac{dS}{dT} = \left(f - \frac{f}{f_1} \frac{D_1}{n_1}\right)\left(\alpha_1 + \frac{f}{f_1} \frac{D_1}{n_1^2 R_2} \cdot \frac{n_1}{\alpha T}\right) + \quad (22)$$

$$\left(\frac{f}{f_1} \frac{D_1}{n_1^2} - \frac{f}{n_1 - 1}\right) \cdot \frac{dn_1}{dT} +$$

$$\frac{D_3}{n_3}\left\{(n_1 - 1)\alpha_3 + \frac{1}{n_3} \frac{dn_3}{dT}\right\} = \alpha_2 L.$$

If the radiation source is a diode laser with a temperature-dependent wavelength, dn/dT in the expressions 21 and 22 must be replaced by $$\frac{\partial n}{\partial \lambda} \cdot \frac{\partial \lambda}{\partial T} + \frac{\partial n}{\partial T}$$

If the collimator lens is a planoconvex lens, its convex surface preferably has an aspherical profile in order to correct for spherical aberrations. As described in U.S. Pat. No. 4,592,627 and as shown in FIG. 5, the aspherical surface may be in the form of an aspherical outer profile 57 of a thin layer of transparent synthetic material 56 which is provided on the convex surface 55 of the lens 37. In the afore-mentioned expressions for the equivalent coefficient of expansion there are no quantities which relate to this synthetic material layer because, due to the small thickness of the layer, the temperature effects in the layer hardly have any influence on the focal length of the overall optical system within the holder.

Certain types of diode lasers emit an astigmatic beam, i.e. a beam which, viewed in two mutually perpendicular planes, has two axially shifted points of convergence. When using this type of laser in an optical radiation source unit, a cylindrical lens is generally used to render the beam stigmatic. This cylindrical lens may be integrated with the collimator lens by superposing the required cylindrical shape on the surface of the collimator lens facing the diode laser. In that case the above given expressions for the equivalent coefficient of expansion remain valid because the radius of curvature of the said cylindrical lens is of the order of a hundred times that of the convex surface of the collimator lens so that the position of the focus of the optical system within the holder is substantially uninfluenced by the presence of the cylindrical lens and by variations in the behaviour of this lens.

It has been assumed in the foregoing that the radiation source in the holder is secured at the position of the radiating surface and that the collimator lens is secured at the position of the point of intersection of the surface 38 and the optical axis. If the fixations are located elsewhere, the coefficient of expansion of the portions of the holder between the points of fixation and the axial positions of the radiating surface of the radiation source and the surface of the collimator lens facing the radiation source must be taken into account, as is known from, for example German patent application No. 2,830,341. The influence of the changes of these portions can be calculated and the above given conditions for the temperature compensation can then be corrected.

A radiation source unit supplying a collimated beam can also be used in a so-called target-seeking device with which a target can be traced and/or followed by means of a beam emitted by the radiation source unit and received by a radiation-sensitive detector. The temperature compensation according to the invention can also be used in this device.

The invention is not limited to a radiation source unit but may be generally applied in optical systems whose optical behaviour should not be influenced by a change of the holder accommodating this system. A system which must have a constant factor of magnification such as a telecentric system shown diagrammatically in FIG. 6 may be mentioned as an example.

Figure 6:
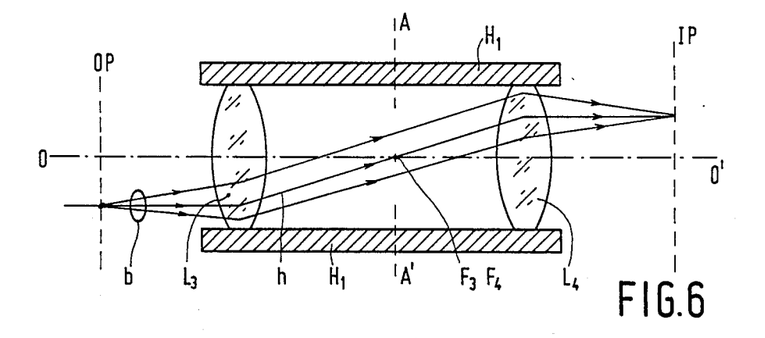
FIG. 6 shows a telecentric lens system.

A telecentric lens system comprises a number of, for example two lenses, $L_3$ and $L_4$ in FIG. 6 with given powers and mutual distances. If the centre of the so-called aperture stop AA' of this system is located in the focus $F_4$ of the lens $L_4$, the exit pupil of the system, i.e. the image of the aperture stop formed by the lens $L_4$ is located at infinity and the system is telecentric on the image side. This means that the chief ray h of each beam b traversing the system is perpendicularly incident on the image plane IP. If the aperture stop is in the focus $F_3$ of the lens $L_3$, the entrance pupil is located at infinity and the system is telecentric on the object side, OP' is the object plane which is conjugated to the image plane IP. In a double telecentric system as is shown in FIG. 6, $F_3$ and $F_4$ both coincide with the centre of the aperture stop. According to the invention the variation of the distance between the lenses which is caused by a temperature-dependent variation in length of the holder $H_1$ can be compensated by adapting the coefficients of expansion and the refractive indices of the lenses to the coefficient of expansion of the holder. Analogously as described above for a radiation source unit, the condition at which the temperature compensation occurs can be derived for a telecentric system.

What is claimed is:

1. An optical device comprising a holder and means for fixing a system of optical elements thereto, characterized in that the parameters:

the coefficients of expansion of the materials of the optical elements, the refractive indices of these materials and their variations with temperature, and the dimensions of the optical elements which control the change in the optical behaviour of the system of optical elements, are adapted to the coefficients of expansion of the holder material which is located between the fixing means of the holder thereby ensuring that the optical device is substantially independent of temperature variations.

2. An optical device having a radiation source and a holder including means for fixing therewithin optical elements the optical behavior of said optical device being altered by thermal expansion or contraction of said holder, the improvement comprising compensation means for the thermal expansion or contraction of said holder, said compensation means comprising selection the coefficients of thermal expansion of the optical elements, the refractive index of the optical elements and the variation in refractive index due to variation in temperature so as to counterbalance the changes caused by the thermal expansion or contraction of said holder.

3. An optical device as claimed in claim 1 in the form of an optical radiation source unit supplying a collimated radiation beam and having a radiation source and a collimator lens whose object focal plane must coincide with the radiating surface of the radiation source, characterized in that the collimator lens is a single lens and in that the equivalent coefficient of expansion giving the variation of the front focal length of the collimator lens as a function of the temperature is equal to the coefficient of expansion of the holder material which is present between the optical element fixing means on the holder of the radiation source and the collimator lens.

4. An optical device as claimed in claim 2, characterized in that the collimator lens is a planoconvex lens and in that the following condition is satisfied:

$$\alpha_{eq} \cdot f_t = \alpha_1 \left( f - \frac{D_1}{n_1} \right) +$$

$$\left( \frac{D_1}{n_1^2} - \frac{f}{n_1 - 1} \right) \frac{dn_1}{dT} = \alpha_2 \cdot L.$$

$\alpha_{eq}$ is the equivalent optical coefficient of expansion,
$f_t$ is the front focal length,
f is the object focal length of the collimator lens
$\alpha_1$ is the coefficient of linear expansion of the collimator lens material,
$D_1$ is the axial thickness of the collimator lens,
$n_1$ is the refractive index of the collimator lens material,
d/dT is the derivative with respect to temperature,
$\alpha_2$ is the coefficient of linear expansion of the holder material between the radiation source and the collimator lens and
L is the length of the holder between the radiation source and the collimator lens.

5. An optical device as claimed in claim 4, in which the radiation source is a diode laser whose wavelength is temperature-dependent, characterized whose wavelength is temperature-dependent, characterized in that the following condition is satisfied $$\alpha_1 \left( f - \frac{D_1}{n_1} \right) +$$

$$\left( \frac{D_1}{n_1^2} - \frac{f}{n_1 - 1} \right) \left( \frac{\partial n_1}{\partial \lambda} \cdot \frac{\partial \lambda}{\partial T} + \frac{\partial n_1}{\partial T} \right) = \alpha_2 L.$$

in which $\partial/\partial\lambda$ and $\partial/\partial T$ are the partial derivatives with respect to wavelength and temperature, respectively.

6. An optical device as claimed in claim 3 whose collimator lens is a biconvex lens, characterized in that the following condition is satisfied $$\left( f - \frac{f}{f_1} \cdot \frac{D_1}{n_1} \right) \cdot \left( \alpha_1 + \frac{f}{f_1} \cdot \frac{D_1}{n_1^2 R_2} \cdot \frac{dn_1}{dT} \right) +$$

$$\left( \frac{f}{f_1} \cdot \frac{D_1}{n_1^2} - \frac{f}{n_1 - 1} \right) \cdot \frac{dn_1}{dT} = \alpha_2 L.$$

in which
f is the object focal length of the collimator lens,
$\alpha_1$ is the coefficient of linear expansion of the collimator lens material
$f_1$ is the equivalent focal length of only the surface of the collimator lens remote from the radiation source,
$D_1$ is the axial thickness of the collimator lens,
$n_1$ is the refractive index of the collimator lens material,
$R_2$ is the radius of curvature of the surface of the collimator lens facing the radiation source,
d/dT is the derivative with respect to temperature,
$\alpha_2$ is the coefficient of linear expansion of the holder material between the radiation source and the collimator lens and
L is the length of the holder between the radiation source and the collimator lens.

7. An optical device as claimed in claim 6, in which the radiation source is a diode laser whose wavelength is temperature-dependent, characterized in that the following condition is satisfied $$\left( f - \frac{f}{f_1} \cdot \frac{D_1}{n_1} \right) \left( \alpha_1 + \right.$$

$$\frac{f}{f_1} \cdot \frac{D_1}{n_1^2 R_2} \left( \frac{\partial n_1}{\partial \lambda} \cdot \frac{\partial \lambda}{\partial T} + \frac{\partial n_1}{\partial T} \right) \right\} +$$

$$\left( \frac{f}{f_1} \cdot \frac{D_1}{n_1^2} - \frac{f}{n_1 - 1} \right) \left( \frac{\partial n_1}{\partial \lambda} \cdot \frac{\partial \lambda}{\partial T} + \frac{\partial n_1}{\partial T} \right) = \alpha_2 \cdot L.$$

in which $\partial/\partial\lambda$ and $\partial/\partial T$ are the partial derivatives with respect to wavelength and temperature, respectively.

8. An optical device as claimed in claim 3, in which a beam-separating element is arranged between the collimator lens and the radiation source, characterized in that the collimator lens is a planoconvex lens and in that the following condition is satisfied $$\alpha_1 \left( f - \frac{D_1}{n_1} \right) + \left( \frac{D_1}{n_1^2} - \frac{f}{n_1 - 1} \right) \frac{dn_1}{dT} +$$

$$\frac{D_3}{n_3} \left\{ (n_3 - 1) \alpha_3 + \frac{1}{n_3} \cdot \frac{dn_3}{dT} \right\} = \alpha_2 \cdot L$$

in which
$\alpha_1$ is the coefficient of linear expansion of the collimator lens material,
f is the object focal length of the collimator lens,
$D_1$ is the axial thickness of the collimator lens,
$n_1$ is the refractive index of the collimator lens material,
$D_3$ is the axial thickness of the beam-separating element,
$n_3$ is the refractive index of the material of this element,
$\alpha_3$ is the coefficient of linear expansion of the element material,
d/dT is the derivative with respect to temperature, L is the length of the holder between the radiation source and the collimator lens, and
$\alpha_2$ is the coefficient of linear expansion of the holder material between the radiation source and the collimator lens.

9. An optical device as claimed in claim 8, in which the radiation source is a diode laser whose wavelength is temperature-dependent, characterized in that the following condition is satisfied $$\alpha_1 \left( f - \frac{D_1}{n_1} \right) +$$

$$\left( \frac{D_1}{n_1^2} - \frac{f}{n_1 - 1} \right) \left( \frac{\partial n_1}{\partial \lambda} \cdot \frac{\partial \lambda}{\partial T} + \frac{\partial n_1}{\partial T} \right) +$$

-continued $$D_3\left\{\frac{n_3-1}{n_3}\alpha_3 + \frac{1}{n_3^2}\left(\frac{\partial n_3}{\partial \lambda}\cdot\frac{\partial \lambda}{\partial T} + \frac{\partial n_3}{\partial T}\right)\right\} = \alpha_2 \cdot L$$

in which $\partial/\partial\lambda$ and $\partial/\partial T$ are the partial derivatives with respect to wavelength and temperature, respectively.

10. An optical device as claimed in claim 3, in which a beam-separating element is arranged between the radiation source and the collimator lens, characterized in that the collimator lens is a biconvex lens and in that the following condition is satisfied $$\left(f - \frac{f}{f_1}\frac{D_1}{n_1}\right)\left(\alpha_1 + \frac{f}{f_1}\frac{D_1}{n_1^2 R_2}\cdot\frac{dn_1}{dT}\right) +$$

$$\left(\frac{f}{f_1}\frac{D_1}{n_1^2} - \frac{f}{n_1-1}\right)\cdot\frac{dn_1}{dT} +$$

$$D_3\left(\frac{n_3-1}{n_3}\alpha_3 + \frac{1}{n_3^2}\frac{dn_3}{dT}\right) = \alpha_2 \cdot L.$$

in which
- f is the object focal length of the collimator lens,
- $f_1$ is the equivalent focal length of only the surface of the collimator lens remote from the radiation source,
- $D_1$ is the axial thickness of the collimator lens,
- $n_1$ is the refractive index of the collimator lens material,
- $\alpha_1$ is the coefficient of linear expansion of the collimator lens material,
- $R_2$ is the radius of curvature of the surface of the collimator lens facing the radiation source,
- $D_3$ is the axial thickness of the beam-separating element,
- $n_3$ is the refractive index of the material of this element,
- $\alpha_3$ is the coefficient of linear expansion of the element material,
- d/dT is the derivative with respect to temperature,
- $\alpha_2$ is the coefficient of linear expansion of the holder material between the radiation source and the collimator lens and
- L is the length of the holder between the radiation source and the collimator lens.

11. An optical device as claimed in claim 10, in which the radiation source is a diode laser whose wavelength is temperature-dependent, characterized in that the following condition is satisfied $$\left(f - \frac{f}{f_1}\frac{D_1}{n_1}\right)\left(\alpha_1 + \right.$$

$$\left.\frac{f}{f_1}\frac{D_1}{n_1^2 R_2}\left(\frac{\partial n_1}{\partial \lambda}\cdot\frac{\partial \lambda}{\partial T} + \frac{\partial n_1}{\partial T}\right)\right\} + \left(\frac{f}{f_1}\frac{D_1}{n_1^2} - \right.$$

$$\left.\frac{f}{n_1-1}\right)\left(\frac{\partial n_1}{\partial \lambda}\cdot\frac{\partial \lambda}{\partial T} + \frac{\partial n_1}{\partial T}\right) +$$

$$D_3\left\{\frac{n_3-1}{n_3}\alpha_3 + \frac{1}{n_3^2}\left(\frac{\partial n_3}{\partial \lambda}\cdot\frac{\partial \lambda}{\partial T} + \frac{\partial n_3}{\partial T}\right)\right\} = \alpha_2 \cdot L.$$

in which $\partial/\partial\lambda$ and $\partial/\partial T$ are the partial derivatives with respect to wavelength and temperature, respectively.

12. A device for scanning an information plane in an optical record carrier, which device comprises a radiation source supplying a scanning beam and an objective system for focusing the scanning beam to a scanning spot in the information plane, characterized in that the radiation source is in the form of a radiation source unit is claimed in claim 3.

* * * * *